United States Patent [19]
Gagnon

[11] 3,866,345
[45] Feb. 18, 1975

[54] FISHING TACKLE

[75] Inventor: David P. Gagnon, East Sandwich, Mass.

[73] Assignee: The Sippican Corporation, Marion, Mass.

[22] Filed: Aug. 10, 1973

[21] Appl. No.: 387,230

[52] U.S. Cl..................................... 43/4, 43/43.12
[51] Int. Cl.............................................. A01k 91/00
[58] Field of Search............................. 43/4, 43.12

[56] References Cited
UNITED STATES PATENTS

| | | | |
|---|---|---|---|
| 2,768,468 | 10/1956 | Kibler et al. | 43/43.12 |
| 3,031,788 | 5/1962 | Shannon | 43/4 |
| 3,628,274 | 12/1971 | Wojahn | 43/4 |
| 3,785,079 | 1/1974 | Rohn | 43/4 |

*Primary Examiner*—Louis G. Mancene
*Assistant Examiner*—Daniel J. Leach
*Attorney, Agent, or Firm*—Nolte and Nolte

[57] ABSTRACT

Fishing tackle is shown in which the line comprises electrical conductors which at one end are connected to a temperature responsive probe near the lure and at the other end is wound on a reel which is specially designed for or adapted to connect the conductors to an indicator whereby a fisherman can then determine the temperature of the water in the region where the probe is located.

4 Claims, 6 Drawing Figures

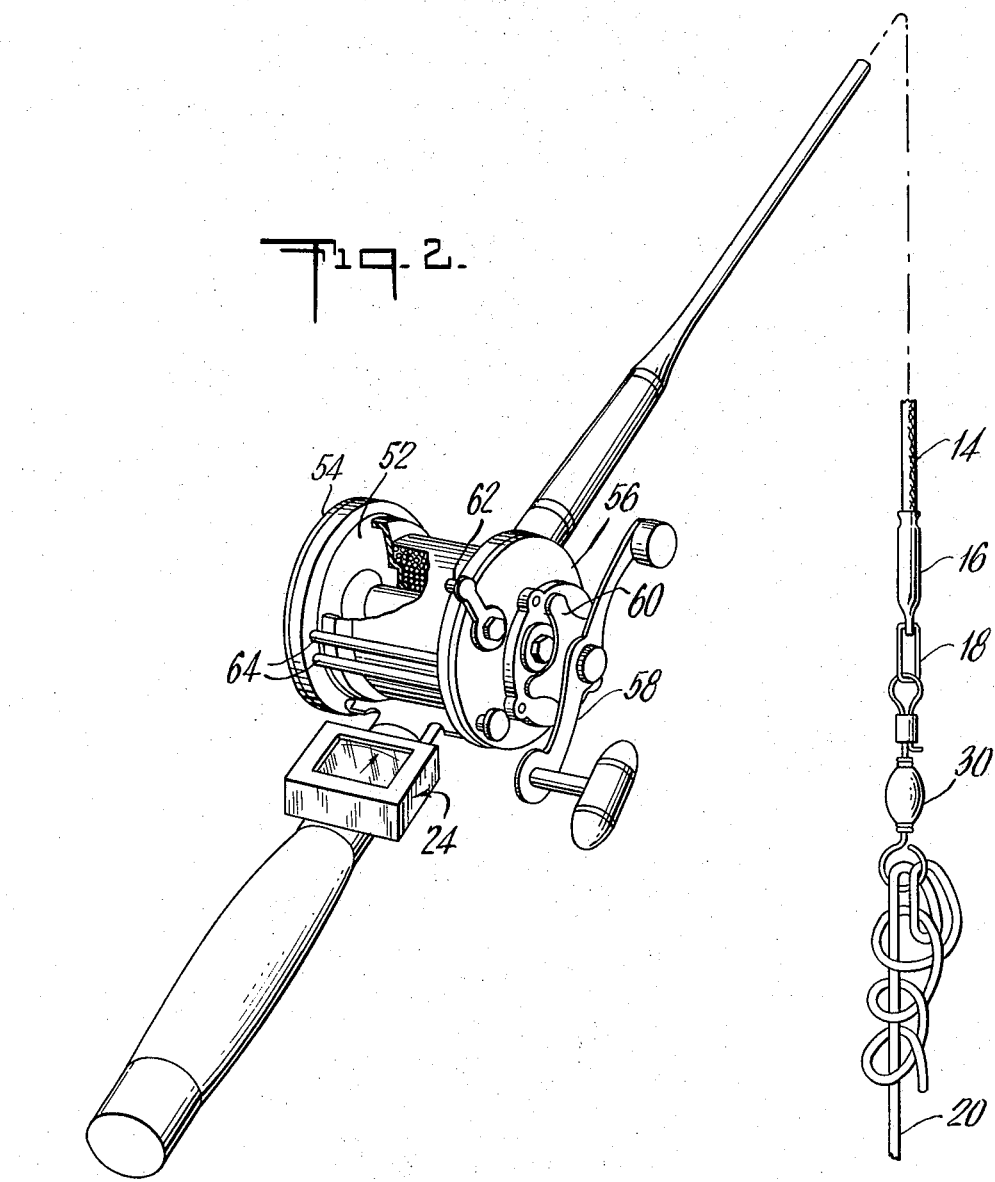
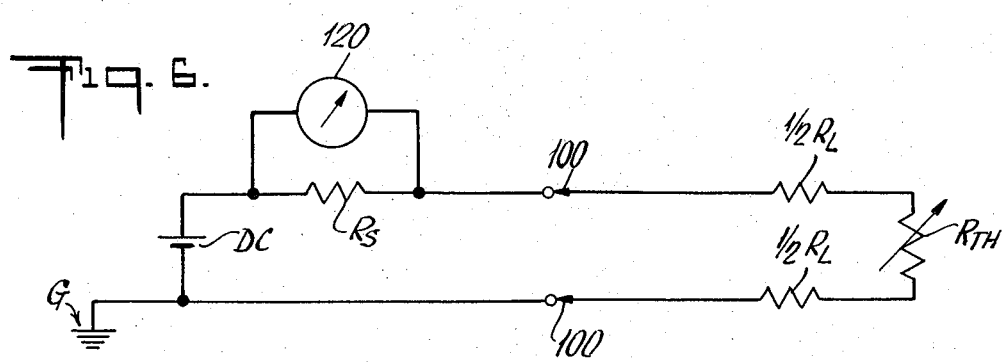

FISHING TACKLE

This invention is concerned with fishing and particularly with rod and reel fishing.

The desirability of being aware of the temperature of the water adjacent the bait or lure when fishing is well known and is described for example in U.S. Pat. No. 3,031,788 issued May 1, 1962 to Melvin L. Shannon.

In Shannon's patent there is shown a fishing line which includes electrical conductors to which a thermistor is connected as one limb of a bridge circuit the output of which is related to the ambient temperature of the water at which the thermistor is located and is connected to a milliammeter. The connection of the conductors of the fishing line to the milliammeter is made through an arrangement of slip rings and brushes.

One, and a major problem in such devices, is that as the line breaks the thermistor is lost and this is a quite expensive item.

To avoid this problem, workers in this art have in the past resorted to the use of two separate reels, one for the fishing line and the other for the conductor connected to a thermistor or other temperature sensitive probe and arranged that those lines, normally formed at the lure, should be separated on a strike. An example of this is U.S. Pat. No. 3,628,274 issued to Wojahn. However, this solution has not been entirely satisfactory since it is expensive and of course after playing a fish both lines must be reeled in and rejoined before they can again be used.

It is an object of this invention to provide fishing tackle in which the probe is protected from loss.

It is also an object of this invention to provide a system which may be adapted readily to existing tackle rather than requiring a fisherman to buy completely new tackle to take advantage of this invention. An embodiment of this invention is illustrated in the accompanying drawings in which:

FIG. 2 is a view of the tackle according to this invention;

FIG. 6 is an illustration of the circuitry of this invention.

Figure 1:
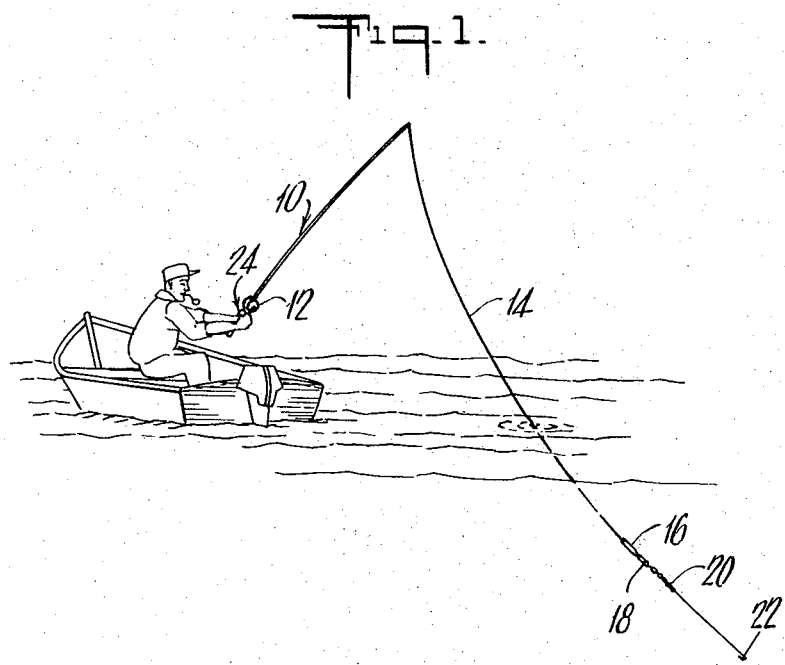
FIG. 1 is a schematic view showing how the device might be used.

In FIG. 1 there is shown a boat and fisherman, the fisherman having a rod 10 and reel 12 and a line 14 with a temperature sensitive probe 16 connected by a weak link 18 to a leader 20 and a hook 22.

The line is conductive in a manner described hereinafter and the probe is connected by the line to a meter or indicator 24 which is adapted to give the fisherman an indication of the temperature of the water at the probe which is, of course, in the region of the lure.

Referring particularly to FIG. 2, it will be seen that the leader 20 is connected by a knot (as illustrated, a fisherman's bend) to a swivel 30 which connects the lure to weak link 18, as illustrated, this weak link being a closed loop which is passed through an eyelet in the probe 16. The line 14 comprises a pair of thin wire conductors with a nylon or dacron overbraid. Other materials for the overbraid could be used and clearly a filler could be utilized if desired. The wire may, of course, have a tensile strength and insulation integrity compatible with the rate of breaking strain of the line. Alternatively, the conductors could be of somewhat greater length than the overbraid so that the tension on the line during casting or playing a fish would be borne by the overbraid, i.e., the conductors could be stress relieved.

It is to be noted that the weak link is one which will fail before the line fails and preferably one which will fail before 15% of line elongation occurs since the bathythermographic wire used in this line can withstand elongations of up to about 15% without any substantial loss of insulation resistance.

Figure 3:
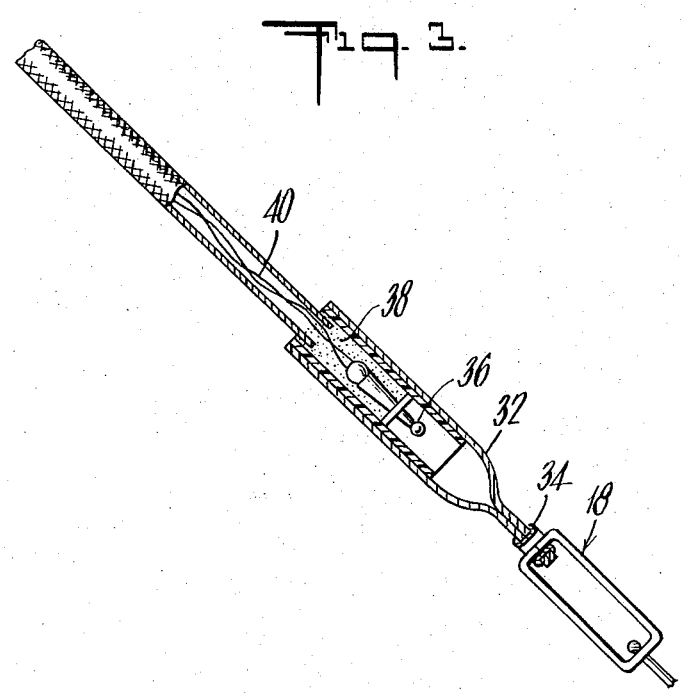
FIG. 3 is a detail of the tackle shown in FIG. 2.

FIG. 3 is an enlargement of the probe shown in FIG. 2 and from that figure it is seen that the probe comprises a brass housing 32 with an eyelet 34 by which the weak link is connected to the housing. The housing contains a thermistor 36 and a plastic insulating sleeve 38 through which the connection of the conductors 40 of the line are made to the thermistors. Potting is provided to protect the connectors to the thermistor, that potting being, for example, a conventional epoxy compound.

Figure 4:
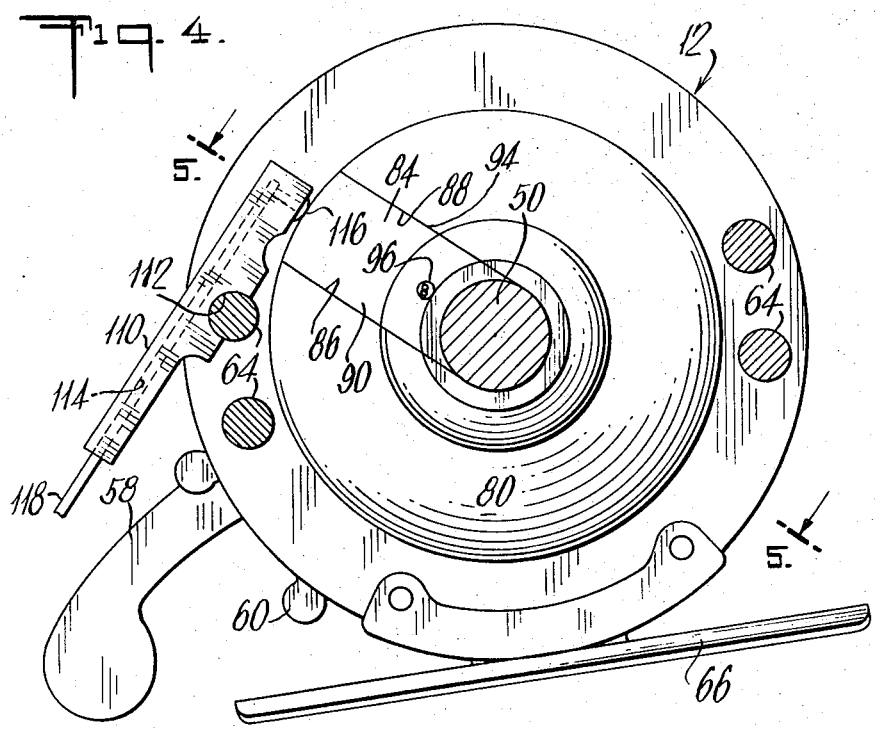
FIG. 4 is a part sectional view of the reel according to this invention.
Figure 5:
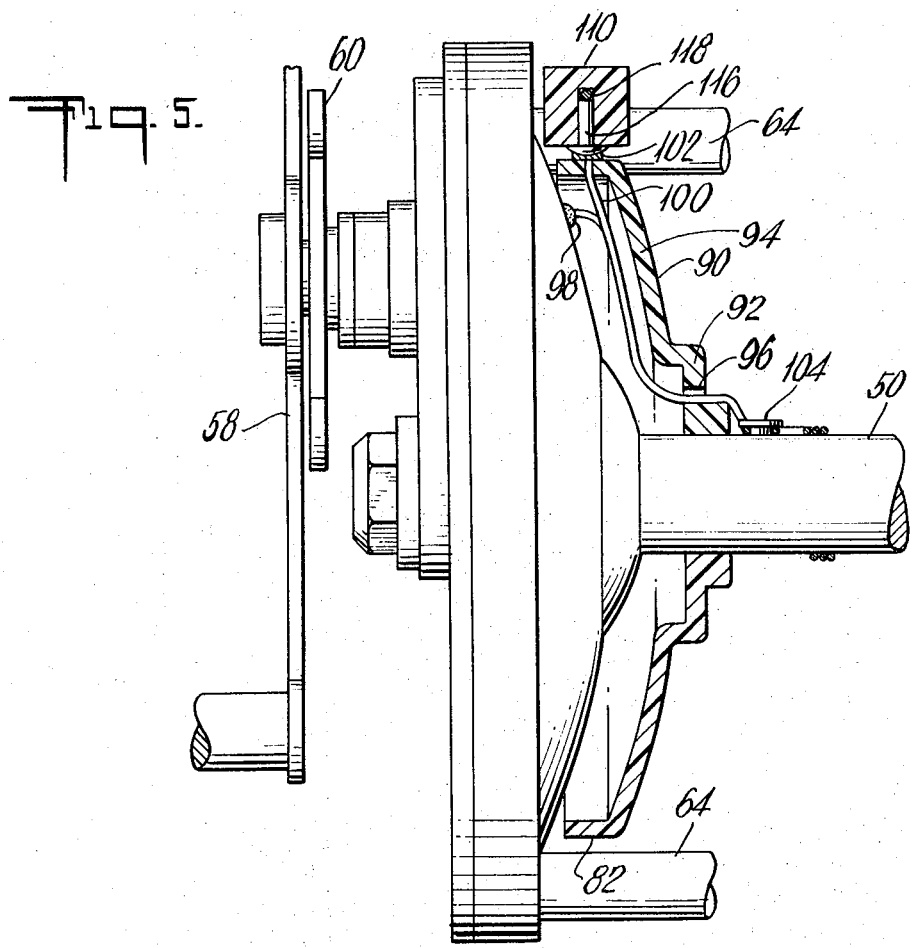
FIG. 5 is a section on the line 5—5 of FIG. 4.

The reel, according to the invention, is illustrated particularly in FIGS. 2, 4 and 5. It comprises a spindle 50 to which are secured rotatable cheeks 52 mounted between frame members 54 and 56, the frame member 56 including the gearing by which the reel spindle is rotated by the crank 58.

The reel has the conventional tensioning star wheel 60 and trigger 62 for allowing the reel to be used for casting and reeling in the line. Rods 64 extend between the frames members to support them.

Conventionally the reel has a bracket 66 by which it is connected to a rod.

The reel in this particular embodiment is modified to allow the connection of the conductors of the line to an indicating meter 24. The modification primarily consists of a plastic adapter or cheek element 80 which is fitted to the spindle and to the rotating cheek 52 to be rotatable therewith. As seen particularly in FIG. 5, the adapter element 80 is generally disc shaped with an annular cylindrical flange 82 which is adjacent the rotating cheek 52 to define a space between the interior surface of adapter element 80 and the outer face of the cheek 52. A section 84 of the adapter element 80 is omitted, that section being defined by two chordal lines 86 and 88 extending from the spindle 50 to the circumference of the adapter member, the lines being tangential to the spindle so that the adapter member can be inserted radially onto the spindle, the spindle passing through the space between the two lines 86 and 88.

Referring now particularly to FIG. 4, it will be seen that the space defined by lines 86 and 88 is filled by an insert 90 which completes the dish-like form of the adapter member 80. The insert 90 comprises a base 92 and side walls 94. An opening 96 extends through the base 92 and into the channel defined by the base 92 and the side walls 94.

Through this opening 96 the end of the line is passed and one of the conductors is grounded to the reel body as at 98 while the other is connected as at 100 to a contact 102 secured to the insert member by an appropriate adhesive or by other means. As can be seen particularly in FIG. 5, the line is secured to the spindle on a post 104.

Referring again to FIG. 4, there is shown a contact member 110 which acts in the manner of a switch and comprises a plastic body with a part circular groove 112 in one surface thereof by which the body is snap fitted over one of the rods 64 to be pivotable about that rod.

A passage 114 is formed through the body and an electrically conductive stud 116 is set into the body to intercept the passage 114. An electrical conductor 118 is passed through the passage 114 and electrically connected to the stud 116 and to the meter 24 to complete the circuit illustrated particularly in FIG. 6.

It will be appreciated that the member 110 being pivoted about the rod 64 can be shifted to bring the stud into electrical contact with the contact 102 of the insert member 92 so that a circuit is completed from one of the conductors in the line to the meter. It will be appreciated that in the particular embodiment illustrated the adapter member and the spindle upon which it is mounted must be in the position illustrated in FIG. 4 relatively to the member 110 to enable this contact to be completed. As an alternative to the particular embodiment illustrated in FIG. 4, it will be appreciated that the contact 102 could be in the form of a ring extending fully around the adapter member in which case the particular location of the spindle would not be important in the reading of the temperature. It has been found that by arranging the body in the manner here illustrated an indication of the temperature at the probe can be obtained only when it is required and in this way the battery or other source is conserved.

Referring now to FIG. 6, it wil be seen that the circuit basically comprises the conductors of the line, each one of which has a resistance one half of $R_L$, $R_L$ being the total resistance of the line, to which the thermistor $R_{TH}$ is connected. At the interface indicated by the arrows at the ends of the line and represented in the embodiment illustrated in FIGS. 4 and 5 by the contact 110, the line, or one of the conductors of the line is connected to a meter 120 shunted around resistor $R_S$. A power source DC is included in the meter casing and comprises a small battery, such as a 1-½ volt dry cell battery.

The circuit is grounded as at G. In this way the meter 120 reads variations in the resistance of the thermistor $R_{TH}$ and of course can be calibrated to give an indication of the temperature of the thermistor.

It will of course be appreciated that while the embodiment of the invention herein shows a casting type reel, the invention is equally applicable to spinning type reels and that rather than the adaptation shown herein, it is quite possible to produce a reel in which the means for completing the circuit from the thermistor on the line and the indicators is built in.

What is claimed is:

1. Fishing tackle comprising a line having a pair of insulated conductors and a temperature responsive probe at an end of the line said probe comprising a thermistor electrically connected to said conductors; a link element for attaching a leader and lure to the probe, said link element being more susceptible to breakage than said line whereby said link is constituted as means preventing the loss of the probe on the application of tension to a leader attached thereto by breaking before the line breaks, one of said conductors at an end of the line remote from said probe being connected to ground and electrically connectable to one electrode of a battery and the other of said conductors at that end of the line remote from the probe being connected in series with a meter and connectable to the other electrode of said battery, said link being constituted as means preventing the elongation of said conductors beyond a predetermined limit which would result in an error signal at said meter.

2. Fishing tackle as claimed in claim 1 wherein said line comprises a pair of insulated conductors and an overbraid, the conductors being stress relieved whereby said overbraid is constituted as additional means for protecting said conductor against the effect of tension.

3. Fishing tackle comprising a line having two insulated conductors therein, a thermistor electrically connected to said conductors, a reel, said line being secured to said reel to be wound thereon and therefrom, one of said conductors being electrically grounded at said reel and the other being connected in series with a resistance measuring meter and means for connecting a battery to complete a circuit comprising said conductors, meter and thermistor and means preventing elongation of said line beyond a predetermined limit above which the integrity of line insulation would be jeopardized and above which variation in line resistance would produce an error signal at the meter.

4. Fishing tackle as claimed in claim 3 wherein said means preventing elongation of said conductors comprises a link element for attaching a leader and lure to the thermistor, said link having a breaking tension no greater than the tension which would produce said predetermined elongation limit of said line.

* * * * *